July 16, 1968 J. W. OLSON 3,393,298

DOUBLE-RANK BINARY COUNTER

Filed April 1, 1965 2 Sheets-Sheet 1

INVENTOR
J. W. OLSON
BY [signature]
ATTORNEY

July 16, 1968 J. W. OLSON 3,393,298

DOUBLE-RANK BINARY COUNTER

Filed April 1, 1965 2 Sheets-Sheet 2

United States Patent Office 3,393,298

Patented July 16, 1968

3,393,298

DOUBLE-RANK BINARY COUNTER

John W. Olson, Morris Township, Morris County, N.J., assignor to Bell Telephone Laboratories, Incorporated, New York, N.Y., a corporation of New York Filed Apr. 1, 1965, Ser. No. 444,597
8 Claims. (Cl. 235—92)

ABSTRACT OF THE DISCLOSURE

A double-rank counter which counts in both conventional binary code and gray code simultaneously is disclosed. Each rank acts as a store for the other and the dual count is obtained by selectively interconnecting the elements of the two ranks.

Figure 1:
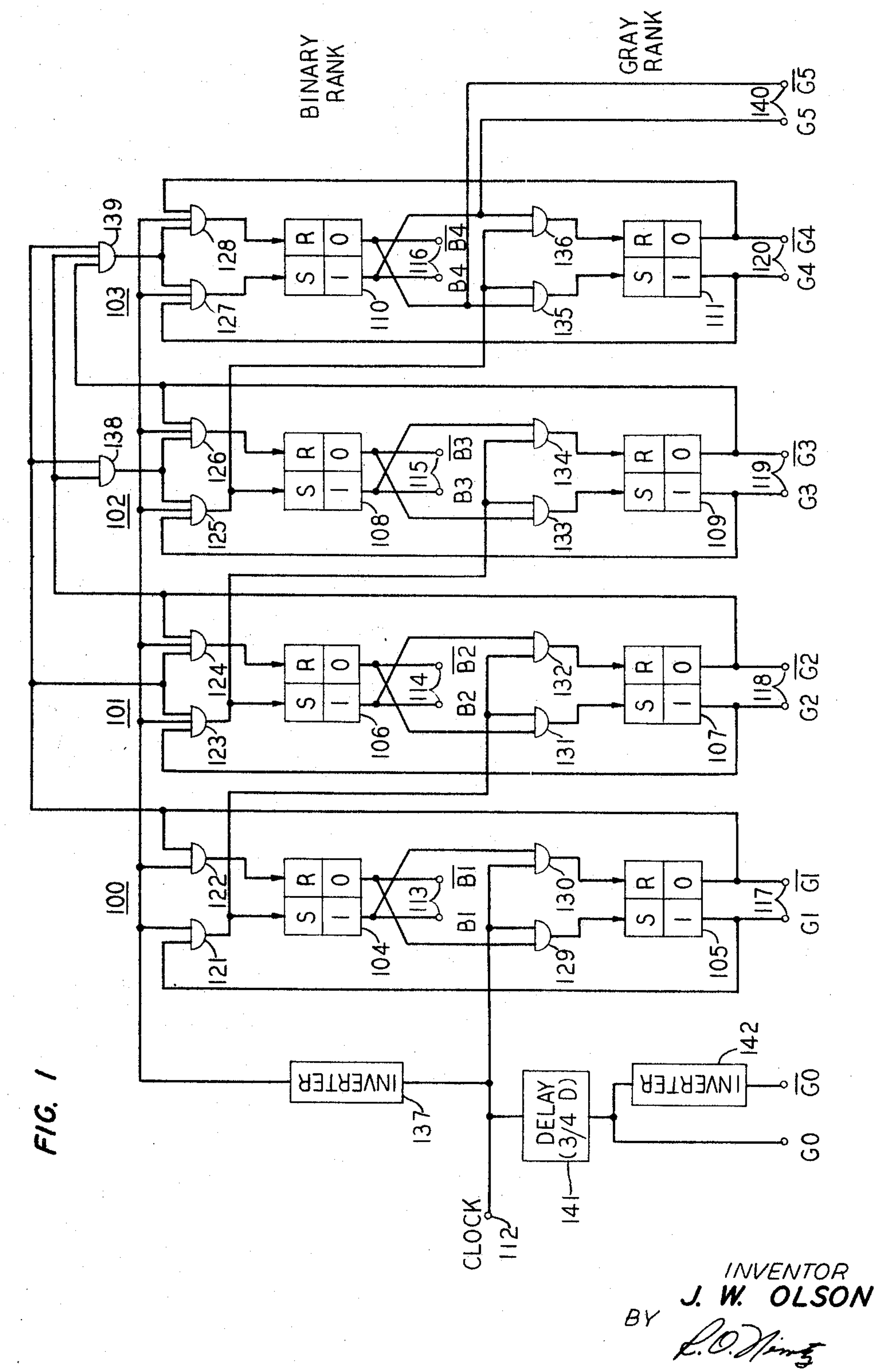

This invention relates to digital information processing systems and, more particularly, to double-rank binary counting circuits for use in such systems.

Conventional binary counters are either of the serial or parallel carry type. In a serial carry counter, pulses to be counted are applied to the lowest order binary stage. Each time this stage changes state in a particular direction, a pulse is sent to the next higher order stage. This higher order stage, in turn, likewise sends a pulse to the next higher order stage, and so forth. Since the carry signals must propagate through all of the stages in a serial fashion, the time required for the count to settle down to the desired value may be objectionably long and, indeed, may be longer than the period of the pulses to be counted.

In order to overcome the disadvantage of carry propagation in serial carry counters, the so-called parallel carry counter was developed. In a parallel carry counter, all of the inputs to all of the stages are each derived from a coincident gate. The outputs of all lower order stages are applied to these gates in a pattern which opens the gates only for those stages due to be altered on the next advance pulse. This advance pulse then immediately traverses the gates and simultaneously alters all of the required stages.

One disadvantage of parallel carry binary counters is the requirement for control gates having a large number of inputs. In a counter with a large number of stages, the design of coincidence gates with such a large number of inputs becomes difficult as the number of inputs increases, and the cost of the gates, as well as their operating characteristics, becomes less desirable.

Another difficulty encountered in parallel binary counters operated at extremely higher speeds is the ambiguity of state during the transition between successive counts. Since the state of a stage is being changed at the same time that the state is being used to control the state of other stages, such ambiguities can lead to inaccuracies in the ultimate count.

In order to overcome the ambiguities inherent in parallel carry binary counters, a transitional storage element must be used to record the previous state until all other stages have been changed. In smaller, slower operating counters, the inherent wiring capacitance forms the required storage element. For large, fast-operating counters, however, separate storage elements must be provided for this purpose.

In one such arrangement, a separate set of bistable elements is provided to store states during transitions of the counter. Such arrangements are called "double-rank" binary counters, one rank, the primary rank, being the set of binary counters doing the actual counting, and the other rank, the secondary rank, merely storing the required states during the transitions of the primary rank.

It is one object of the present invention to increase the speed and accuracy of binary counting circuits.

It is a more specific object of the invention to increase the usefulness of double-rank binary counters.

A further object of the invention is to provide a double-rank binary counter which counts simultaneously in the natural or conventional binary code and the gray or reflected binary code.

In accordance with the present invention, a double-rank binary counter is provided in which one rank counts in the conventional binary code while the other rank counts in the reflected binary code. Each rank serves as a temporary store for the logic conditions required to advance the other rank. Since carry propagation is not required in such a counter, the counts are all available substantially simultaneously. Moreover, the logic required between ranks is very simple, requiring, in the case of the gray rank, simple cross connections.

A major advantage of the present invention is simultaneous availability of counts in both the conventional and gray codes. As is well known, when reading the count from a counter on the fly, the gray code has distinct advantages since only one stage changes for each count. Early and late readings, therefore, can result in no more than a single count error. The conventional binary code, on the other hand, is far more suitable for arithmetic operations. Hence many applications call for the translation between these two codes. The present invention provides both codes simultaneously.

These and other objects and features, the nature of the present invention and its various advantages, will be more readily understood upon consideration of the attached drawings and of the following detailed description of the drawings.

Figure 2:
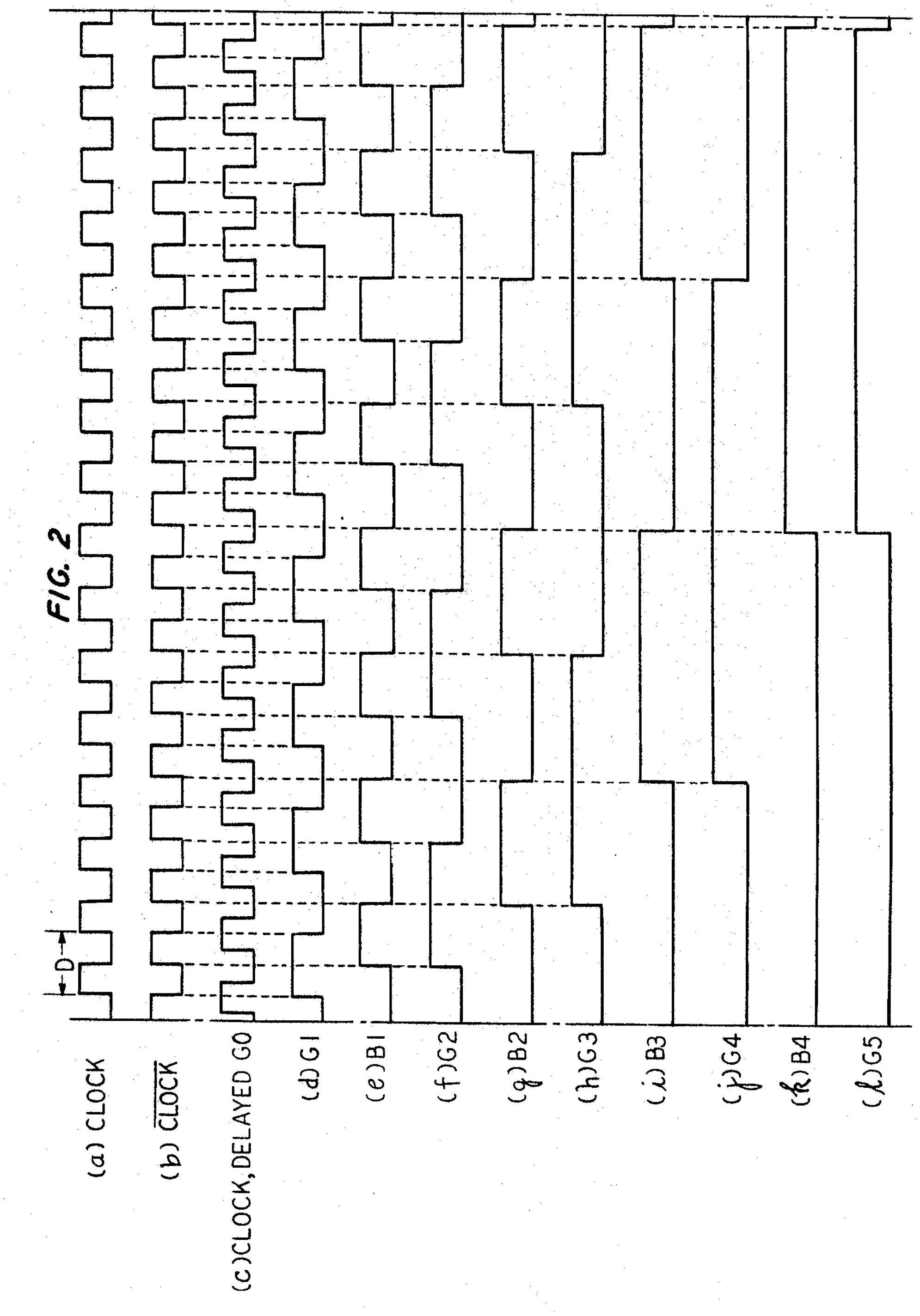

In the drawings:

FIG. 1 is a schematic circuit diagram of a four stage double-rank binary counter in accordance with the present invention; and FIG. 2 is a group of amplitude versus time waveforms useful in understanding the operation of the circuit of FIG. 1.

Before proceeding with a detailed description of the drawings, certain properties of the ordinary and gray codes should be noted. To this end, Table I lists the conventional and gray code equivalents of the noted decimal numbers.

TABLE I

| Decimal | Natural or Ordinary Binary Code | Reflected or Gray Binary Code |
|---|---|---|
| 0 | 0000 | 0000 |
| 1 | 0001 | 0001 |
| 2 | 0010 | 0011 |
| 3 | 0011 | 0010 |
| 4 | 0100 | 0110 |
| 5 | 0101 | 0111 |
| 6 | 0110 | 0101 |
| 7 | 0111 | 0100 |
| 8 | 1000 | 1100 |
| 9 | 1001 | 1101 |
| 10 | 1010 | 1111 |
| 11 | 1011 | 1110 |
| 12 | 1100 | 1010 |
| 13 | 1101 | 1011 |
| 14 | 1110 | 1001 |
| 15 | 1111 | 1000 |

It will be first noted that a property of the gray code is to change only one bit in each count interval. Moreover, the reflected code shown above has the further property of alternating the bit changes between the least significant bit and the bits of higher significance. This is best achieved by utilizing a two-phase clock source, applying one phase to the least significant bit stage and the other phase to the higher significant bit stages.

It will be further noted that the $n$th order gray digit is complemented, i.e., a "0" is change to a "1" or a "1" is changed to a "0," each time the preceding binary digit changes from "0" to "1," with the sole exception of the highest order gray digit, which is identical to the next lower order binary digit.

Finally, it can be seen that each binary stage is set to the "1" state when the corresponding gray digit is in the "1" state and all lower order gray digits are in the "0" state, and is reset to the "0" state when the corresponding gray digit is in the "0" state and all lower order gray digits are also in the "0" state. All of the above relationships can be written as follows:

$$B_n = (\overline{\mathrm{CLOCK}}) \cdot G_n \cdot \overline{G}_{n-1} \cdot \overline{G}_{n-2} \ldots \overline{G}_2 \cdot \overline{G}_1$$

$$B_n = (\overline{\mathrm{CLOCK}}) \cdot \overline{G}_n \cdot \overline{G}_{n-1} \cdot \overline{G}_{n-2} \ldots \overline{G}_2 \cdot \overline{G}_1 \qquad (1)$$

and $$G_n = (B_{n-1}\mathrm{set}) \cdot B_n$$

$$G_n = (B_{n-1}\mathrm{set}) \cdot B_n \qquad (2)$$

where the B's represent binary digits of significance *n*, the G's represent gray digits of significance *n*, and the bar over a quantity represents the inverse. A four stage, double-rank counter implementing these relationships is shown in FIG. 1.

Referring more particularly to FIG. 1, there is shown a schematic diagram of a four stage, double-rank binary counter including stages 100, 101, 102, and 103. Each of these stages comprises two bistable elements. Stage 100, for example, comprises bistable device 104 and bistable device 105; stage 101 comprises bistable device 106 and bistable device 107; stage 102 comprises bistable device 108 and bistable device 109; and, finally, stage 103 comprises bistable device 110 and bistable device 111 is capable of being triggered to either one of two stable states and remaining in that state until triggered to the other stable state. The first of these stable states is, for convenience, represented by a "1." This may be interpreted as the appearance of a distinguishing signal condition such as a positive voltage appearing at the output labeled "1" in the bistable devices 104 through 111. The other stable state can likewise be represented by the appearance of this distinguishing signaling condition at another output of the bistable device labeled "0" in the bistable devices 104 through 111.

These bistable devices art triggered to the "1" output state by the application of a "set" input to the input of the bistable devices labeled "S" in the bistable devices 104 through 111. Similarly, these bistable devices are triggered to the "0" output state by the application of a reset signal to the "reset" and can be labeled "R" in the bistable devices 104 through 111. Such bistable devices are well known in the art and will not be further described here.

The bistable devices 104, 106, 108, and 110 comprise the binary rank of the double-rank counter of FIG. 1. Correspondingly, the bistable devices 105, 107, 109 and 111 comprise the gray rank of a double-rank counter of FIG. 1.

In accordance with the present invention, the binary counter of FIG. 1 responds to the application of clock pulses at input terminal 112 by providing signal conditions at the output terminals 113 through 116 of the binary rank representing a series of binary numbers and in the ordinary or conventional binary code. At the same time, the output terminals 117 through 120 of the gray rank bistable devices provide signal conditions representing a series of binary numbers in the gray or reflected binary code. These two numbering systems can be compared in Table I appearing above. These counting sequences are achieved by the particular interconnection provided between the two ranks of the binary counter.

It will be noted that the set and reset inputs for each of the bistable devices 104 through 111 is derived from a coincidence gate. Such a gate, sometimes called an AND gate, is of the type which provides an output when, and only when, all of its inputs are simultaneously energized. Sixteen such gates are provided; two for each of the bistable devices 104 through 111. Thus coincidence gates 121 and 122 are provided for the set and reset inputs respectively, of bistable device 104; gates 123 and 124 are provided for the set and reset inputs, respectively, of bistable device 106, and so forth.

Referring now to the coincidence gates 129 through 136, providing the triggering inputs for the gray rank bistable devices 105, 107, 109 and 111, it can be seen that one input of each of these gates is derived from the "1" and "0" outputs of the corresponding stage of the binary rank bistable devices 104, 106, 108 and 110. Thus the "1" output from bistable device 104 is applied to the reset coincidence gate 130 of bistable device 105. Similarly the "0" output from the bistable device 104 is supplied to the set coincidence gate 129 for bistable device 105. Each of the succeeding stages of the two ranks of bistable devices have similar cross connections between the output of the binary rank and the input of the gray rank.

The remaining inputs for coincidence gates 129 through 136 are derived as follows: the input of the coincidence gates 129 and 130, for the first stage 105 of the gray rank, is supplied directly from the clock input terminal 112. The remaining inputs for each of the coincidence gates 131 through 136 in the succeeding stages of the gray rank are derived from the set input to the previous stage of the binary rank. Thus, the remaining inputs of coincidence gates 131 and 132 are supplied from the output of set coincidence gate 121 for bistable device 104; the remaining inputs for coincidence gates 133 and 134 are derived from the output of gate 123; and the remaining inputs to coincidence gates 135 and 136 are derived from the output of coincidence gate 125.

The inputs to the coincidence gates for the binary rank bistable devices are derived as follows: one input to each of these gates is derived from the corresponding output of a corresponding stage of the gray rank bistable devices. Thus, one input to coincidence gate 121 is derived from the "1" output of bistable device 105. Similarly, one input to coincidence gate 122 is derived from the "0" output of bistable device 105. This connection of corresponding outputs to corresponding input gates between the gray rank and binary rank bistable devices is carried out in each succeeding stage of a binary counter of FIG. 1.

One other input to each of the gates 121 through 128 is derived from the clock pulses applied to input terminal 112 and inverted by inverter circuit 137. These two inputs comprise the only input to coincidence gates 121 and 122. Coincidence gates for succeeding stages of the binary rank, however, include a further input. This further input comprises the coincident appearance of "0" outputs at each of the preceding stages of the gray rank bistable devices. Thus, the third input to coincidence gates 123 and 124 comprises the "0" output of bistable device 105. The third input to coincidence gates 125 and 126 comprises the coincident appearance of "0" outputs at both bistable devices 105 and 107, as determined by coincidence gate 138. Finally, the third input to coincidence gates 127 and 128 comprises the simultaneous coincidence of "0" outputs from bistable devices 105, 107 and 109, as determined by coincidence gate 139.

It will be noted that coincidence gates 138 and 139 introduce additional delays before the triggering of bistable devices 108 and 110. It is obvious and in full accord with the present invention to supply the inputs to gate 138 directly to coincidence gates 125 and 126 and to supply the inputs to gate 139 directly to gates 127 and 128. Such an arrangement, of course, requires that coincidence gates 125 through 128 provide a large number of inputs, particularly when a large number of stages are provided in the counter. Moreover, in binary counters with a large number of stages, some sort of fan-out circuit is required, at least for the lower order gray rank stages, in order to assure that adequate signal power is supplied to all of the binary rank coincidence gates.

In order to better understand the operation of the binary counter of FIG. 1, a series of graphs of pulse amplitude versus time are shown in FIG. 2, illustrating idealized waveforms at various points in the circuit of FIG. 1. Waveform *a*, for example, represents the clock pulses applied to input terminal 112. It can be seen that these clock pulses are symmetrical square waves having a period D. Waveform *b* in FIG. 2 represents the output of inverter circuit 137 and comprises the clock pulses of waveform *a* inverted, that is, with a 180° phase reversal. Waveforms *e*, *g*, *i*, and *k* represent the output signals at terminals 113 through 116, respectively. Only the "1" output waveforms are shown since the "0" outputs are merely exact inversions of the waveforms shown. Similarly, waveforms *d*, *f*, *h* and *j* represent the "1" output waveforms of bistable devices 105, 107, 109, and 111, appearing at output terminals 117 through 120, respectively.

It will be noted in waveform *d* that the gray digit is complemented each time the clock pulse waveform *a* makes a transition from the low level to a high level. Moreover, the first gray digit in waveform *d* attains the value at each of these transitions which is opposite to the value of the first binary digit, shown in waveform *e*. All of the higher order gray digits are complemented when the next lower order binary digit makes a transition from a low signal level to a high signal level. Thus, in waveform *f*, the second gray digit makes a transition each time the first binary digit, shown in waveform *e*, makes a transition from a low to a high level. Moreover, the transitions in waveform *f* are inverse to the then appearing state of the corresponding binary digit, as shown in waveform *g*.

A careful examination of the waveforms of FIG. 2 will indicate that all of the other relationships expressed in Equations 1 and 2 and implemented by the wiring of FIG. 1 are carried out by the operation of the circuit, as exemplified by the waveforms of FIG. 2. It will be noted, however, that the last gray digit, appearing at output terminals 140 in FIG. 1 and shown in waveform *l* in FIG. 2, is identical to the corresponding output waveform from the next lower order binary stage 110. As is well known, and as can be seen from Table I, the lowest order gray code digit varies at only one-half the rate of the lowest order digit in the ordinary binary code. This means that the first gray digit shown in waveform *d* combines with all the higher order gray digits to provide output counts which advance at a rate which is twice as fast as the rate at which the binary count advances in the corresponding stages. The fifth gray digit, appearing at output terminals 140, is therefore necessary to provide a unique output for all of the gray codes appearing at this faster rate. In other words, in the time it requires the binary rank bistable devices 104 through 110 to advance through all sixteen possible counts, the gray rank bistable devices 105, 107, 109, and 111 advance through thirty-two possible counts when combined with the fifth gray digit at output terminals 140.

The counting rate of the gray rank can be doubled again merely by using a delayed version of the clock pulses as the lowest order gray digit. Thus, the clock pulses applied to input terminal 112 are also applied to a delay circuit 141, having a delay equal to three-fourths of the period D of the clock pulses, as shown in waveform *a* of FIG. 2. These delayed clock pulses, shown in waveform *c* of FIG. 2, are then properly timed to form the lowest order gray digit. An inverter circuit 142 is provided to derive an inverse for this lowest order gray bit. With the arrangement shown in FIG. 1, the gray count advances four counts during each complete period of the clock pulses. It is therefore possible to provide gray count advances at four times the basic clock pulse rate.

It can be seen that the double rank counter shown in FIG. 1 is capable of counting in both the ordinary or natural binary and the gray or reflected binary codes. Moreover, the simplicity of the coupling circuits between the stages and the small amount of delay in the carry propagation paths allows this counter to be used at very high input pulse rates. Such counters, for example, find application for range counting in a high capacity radar system when it is desirable to derive counts from the counter on the fly and yet be able to preset the counter to any preselected count by the use of an ordinary or natural binary code.

It is to be understood that the above-described arrangements are merely illustrative of the numerous and varied other arrangements which may constitute applications of the principles of the invention. Such other arrangements may readily be devised by those skilled in the art without departing from the spirit or scope of this invention.

What is claimed is:

1. A double-rank binary counter comprising a first plurality of bistable circuits forming a binary rank of said counter, a second plurality of bistable circuits forming a gray rank of said counter, a source of pulses to be counted, and means for cross coupling said binary and gray rank bistable circuits to cause said binary rank bistable circuits to advance through the natural binary code in response to said pulses to be counted and to cause said gray rank bistable circuits to advance through the reflected binary code in response to said pulses to be counted.

2. The combination according to claim 1 further including means for delaying said pulses to be counted, and means for inverting said delayed pulses.

3. A binary counter comprising a plurality of binary rank bistable circuits for counting in the natural binary code, a plurality of gray rank bistable circuits for counting in the reflected binary code, a source of pulses, means for combining the outputs of said gray rank bistable circuits with said pulses to advance said binary rank bistable circuits, and means for combining the outputs of said binary rank bistable circuits with said pulses to advance said gray rank bistable circuits.

4. The binary counter according to claim 3 wherein said combining means include a plurality of pulse coincidence gates, the outputs of which are connected to trigger said bistable circuits.

5. The binary counter according to claim 4 wherein said combining means further include cross connections of the outputs of each rank of bistable circuits to the inputs of said pulse coincidence gates connected to the other rank of bistable circuits.

6. A binary counter comprising a plurality of stages, each stage comprising a first rank bistable circuit and a second rank bistable circuit, gating means for triggering each of said bistable circuits to its respective first and second stable states, means for applying the outputs of said first rank bistable circuit to corresponding gating means of said second rank bistable circuit, means for applying the outputs of said second rank bistable circuit to noncorresponding gating means of said first rank bistable circuit, means for applying one output of each first rank bistable circuit of lesser significance to said input gating means for said second rank bistable circuit, and means for applying one output of said gating means for said second rank bistable circuit of one less significance to said gating means for said first rank bistable circuit.

7. A double-rank binary counter comprising a plurality of bistable circuit means arranged in two ranks, a source of pulses to be counted, and means responsive to the outputs of each rank of said bistable circuit means and said pulses to be counted for triggering the other rank of said bistable circuit means according to the Boolean expressions $$B_n=P\cdot G_n\cdot\overline{G}_{n-1}\cdot\overline{G}_{n-2}\ .\ .\ .\ \overline{G}_2\cdot\overline{G}_1$$

$$\overline{B}_n=P\cdot\overline{G}_n\cdot\overline{G}_{n-1}\cdot\overline{G}_{n-2}\ .\ .\ .\ \overline{G}_2\cdot\overline{G}_1$$

$$G_n=P\cdot\overline{B}_n\cdot G_n\cdot\overline{G}_{n-1}\cdot\overline{G}_{n-2}\ .\ .\ .\ \overline{G}_2\cdot\overline{G}_1$$

and $$G_n=P\cdot B_n\cdot G_n\cdot\overline{G}_{n-1}\cdot\overline{G}_{n-2}\ .\ .\ .\ \overline{G}_2\cdot\overline{G}_1$$

where P represents the said pulses to be counted, $n$ is the digit order of the bistable circuit means, the B's are the states of said other rank bistable circuit means, the G's are the states of said first rank bistable circuit means, and the bar over a quantity represents its inverse.

8. A binary counting stage comprising first and second bistable devices adapted to be triggered between two distinguishable stable states, coincidence detecting means for triggering each of said bistable devices to each of its respective stable states, means for inversely coupling the outputs of said first bistable device to the coincidence detecting means of said second bistable device, means for directly coupling the outputs of said second bistable device to the coincidence detecting means of said first bistable device, means for connecting to said coincidence detecting means of said first bistable device the outputs of lower order bistable devices corresponding to said second bistable device, and means for connecting to said coincidence detecting means of said second bistable device the output of the coincidence detecting means of the next lower order bistable device corresponding to said first bistable device.

References Cited

UNITED STATES PATENTS

| | | | |
|---|---|---|---|
| 3,022,003 | 2/1962 | Garrison | 235—92 |
| 3,033,452 | 5/1962 | Mayne | 235—92 |

MAYNARD R. WILBUR, *Primary Examiner.*

G. J. MAIER, *Assistant Examiner.*